US009139738B2

(12) United States Patent
Hamby et al.

(10) Patent No.: US 9,139,738 B2
(45) Date of Patent: Sep. 22, 2015

(54) PELLETIZATION OF PYROLYZED RUBBER PRODUCTS

(71) Applicants: Kenneth W. Hamby, The Woodlands, TX (US); Michael R. Beck, Jr., Akron, OH (US)

(72) Inventors: Kenneth W. Hamby, The Woodlands, TX (US); Michael R. Beck, Jr., Akron, OH (US)

(73) Assignee: TELLUS TECHNOLOGY, INC., San Diego, CA (US)

( * ) Notice: Subject to any disclaimer, the term of this patent is extended or adjusted under 35 U.S.C. 154(b) by 89 days.

(21) Appl. No.: 13/622,661

(22) Filed: Sep. 19, 2012

(65) Prior Publication Data

US 2013/0015608 A1 Jan. 17, 2013

Related U.S. Application Data

(63) Continuation of application No. 12/121,339, filed on May 15, 2008, now Pat. No. 8,323,793.

(60) Provisional application No. 60/938,480, filed on May 17, 2007.

(51) Int. Cl.
| | |
|---|---|
| *B29B 9/08* | (2006.01) |
| *C09C 1/48* | (2006.01) |
| *C10B 53/07* | (2006.01) |
| *C10G 1/10* | (2006.01) |
| *B29B 17/00* | (2006.01) |
| *B29B 17/02* | (2006.01) |
| *C22B 1/24* | (2006.01) |
| *B29B 17/04* | (2006.01) |
| *C09C 1/58* | (2006.01) |
| *B29B 13/10* | (2006.01) |
| *C09C 1/60* | (2006.01) |
| *B29B 15/02* | (2006.01) |

(52) U.S. Cl.
CPC . *C09C 1/48* (2013.01); *C10B 53/07* (2013.01); *C10G 1/10* (2013.01); *B29B 9/08* (2013.01); *B29B 13/10* (2013.01); *B29B 15/023* (2013.01); *B29B 17/0026* (2013.01); *B29B 17/04* (2013.01); *B29B 17/0412* (2013.01); *B29B 2017/0217* (2013.01); *B29B 2017/0224* (2013.01); *B29B 2017/0268* (2013.01); *B29B 2017/0272* (2013.01); *B29B 2017/0464* (2013.01); *B29B 2017/0468* (2013.01); *C01P 2004/61* (2013.01); *C09C 1/482* (2013.01); *C09C 1/487* (2013.01); *C09C 1/58* (2013.01); *C09C 1/60* (2013.01); *C22B 1/2406* (2013.01); *Y10T 428/1334* (2015.01); *Y10T 428/2982* (2015.01)

(58) Field of Classification Search
CPC .. B29B 9/08; B29B 17/0026; B29B 17/0036; B29B 2017/0026; B29B 13/10; B29B 2017/0217; B29B 2017/0224; B29B 2017/0268; B29B 2017/0272; B29B 2017/0464; B29B 2017/0468; B29B 15/02; B29B 15/023; B29B 17/04; B29B 17/0412; B29B 17/0424; B29B 2017/0484; C10G 1/10; C09C 1/48; C09C 1/482; C09C 1/487; C09C 1/58; C09C 1/60; C22B 1/2406; C10B 53/00; C10B 53/07; C01B 53/07; Y10T 428/2982
USPC ........ 425/3, 174.8 R, 174.8 E, 197, 198, 199, 425/201, 202, 506, 215, 216, 217, 294, 297, 425/DIG. 101, 222, 508
See application file for complete search history.

(56) References Cited

U.S. PATENT DOCUMENTS

| | | | |
|---|---|---|---|
| 2,511,088 A | 6/1950 | Whaley, Jr. | |
| 3,282,719 A | 11/1966 | Voet | |
| 3,671,613 A | 6/1972 | Gotshall | |
| 3,725,538 A * | 4/1973 | Brewer | 423/461 |
| 3,830,603 A * | 8/1974 | Blucher et al. | 425/3 |
| 3,834,850 A * | 9/1974 | Takewell et al. | 425/222 |
| 3,868,469 A * | 2/1975 | Chalin | 426/262 |
| 3,900,547 A * | 8/1975 | Hunt et al. | 264/117 |
| 4,050,869 A * | 9/1977 | Takewell et al. | 425/222 |
| 4,061,280 A * | 12/1977 | Box | 241/101.6 |
| 4,149,837 A * | 4/1979 | Baker et al. | 425/10 |
| 4,203,804 A | 5/1980 | Janning et al. | |
| 4,250,158 A * | 2/1981 | Solbakken et al. | 423/449.6 |
| 4,284,616 A | 8/1981 | Solbakken et al. | |
| 4,315,879 A * | 2/1982 | Pfuhl et al. | 264/117 |
| 4,631,156 A * | 12/1986 | Hills et al. | 264/37.29 |
| 4,647,443 A | 3/1987 | Apffel | |
| 4,648,328 A | 3/1987 | Keough | |
| 4,692,167 A * | 9/1987 | Levasseur | 44/629 |
| 5,037,628 A | 8/1991 | Fader | |
| 5,087,436 A | 2/1992 | Roy | |

(Continued)

OTHER PUBLICATIONS

ASTM Standard D3191-10, 2010, "Standard Test Methods for Carbon Black in SBR (Styrene-Butadiene Rubber)—Recipe and Evaluation Procedures," ASTM International, West Conshohocken, PA, 2010; dated 2010.

(Continued)

*Primary Examiner* — Seyed Masoud Malekzadeh
(74) *Attorney, Agent, or Firm* — Fraser Clemens Martin & Miller LLC; Jacob M. Ward

(57) ABSTRACT

A system and method for preparing a pelletized carbon black product is provided. The system includes a source of a carbon black product from a pyrolysis process. A mixer is in communication with the source of the carbon black product. A binder oil storage tank is in fluid communication with the mixer. The binder oil storage tank is configured to inject a desired amount of a binder oil into the mixer to form the pelletized carbon black product.

10 Claims, 1 Drawing Sheet

(56) References Cited

U.S. PATENT DOCUMENTS

| | | | |
|---|---|---|---|
| 5,099,086 A | 3/1992 | Roy | |
| 5,208,401 A | 5/1993 | Roy | |
| 5,229,099 A | 7/1993 | Roy | |
| 5,230,777 A | 7/1993 | Jarrell | |
| 5,264,640 A * | 11/1993 | Platz | 585/241 |
| 5,449,438 A | 9/1995 | Jagau et al. | |
| 5,451,297 A | 9/1995 | Roy | |
| 5,464,503 A | 11/1995 | Avetisian et al. | |
| 5,550,312 A | 8/1996 | Schingnitz et al. | |
| 5,654,357 A | 8/1997 | Menashi et al. | |
| 5,667,750 A * | 9/1997 | Nohr et al. | 264/555 |
| 5,744,668 A | 4/1998 | Zhou et al. | |
| 5,759,465 A * | 6/1998 | Ha | 264/141 |
| 5,759,481 A * | 6/1998 | Pujari et al. | 264/655 |
| 5,783,046 A | 7/1998 | Flanigan | |
| 5,821,396 A | 10/1998 | Bouziane | |
| 5,853,687 A | 12/1998 | Morlec et al. | |
| 5,894,012 A | 4/1999 | Denison | |
| 5,908,165 A * | 6/1999 | Guschall et al. | 241/23 |
| 6,230,634 B1 * | 5/2001 | Okochi et al. | 110/342 |
| 6,271,427 B1 | 8/2001 | Ershag | |
| 6,372,948 B1 | 4/2002 | Flanigan | |
| 6,387,306 B1 * | 5/2002 | Morohashi et al. | 264/102 |
| 6,390,797 B1 * | 5/2002 | Myers | 425/131.1 |
| 6,659,025 B2 | 12/2003 | Yu | |
| 6,736,940 B2 | 5/2004 | Masemore et al. | |
| 6,805,820 B1 * | 10/2004 | Myers | 264/75 |
| 6,835,861 B2 | 12/2004 | Nichols et al. | |
| 7,037,410 B2 | 5/2006 | Flanigan | |
| 7,048,831 B2 | 5/2006 | Bouziane et al. | |
| 7,101,463 B1 | 9/2006 | Weinecke et al. | |
| 7,112,618 B2 | 9/2006 | Otto et al. | |
| 7,157,066 B2 | 1/2007 | Diener et al. | |
| 7,341,646 B2 | 3/2008 | Nichols et al. | |
| 7,344,622 B2 | 3/2008 | Grispin | |
| 7,416,641 B2 | 8/2008 | Denison | |
| 7,497,929 B2 | 3/2009 | Karpetsky et al. | |
| 7,553,577 B2 | 6/2009 | Nakamura et al. | |
| 8,262,378 B2 * | 9/2012 | Okamoto et al. | 425/4 R |
| 8,263,038 B2 | 9/2012 | Steinmeyer et al. | |
| 2002/0125600 A1 * | 9/2002 | Horne | 264/68 |
| 2004/0219363 A1 | 11/2004 | Schuch et al. | |
| 2004/0222541 A1 * | 11/2004 | Moriwaki et al. | 264/40.1 |
| 2005/0087906 A1 * | 4/2005 | Caretta et al. | 264/211 |
| 2005/0165262 A1 | 7/2005 | Nichols et al. | |
| 2006/0163053 A1 | 7/2006 | Ershag | |
| 2007/0182052 A1 * | 8/2007 | Falkenberg et al. | 264/140 |
| 2007/0249887 A1 * | 10/2007 | Kitamura et al. | 588/320 |
| 2009/0098033 A1 * | 4/2009 | Lian et al. | 423/213.5 |

OTHER PUBLICATIONS

Barbooti, M.M., Mohamed, T.J., Hussain, A.A.; Abas, F.O.; "Optimization of pyrolysis conditions of scrap tires under inert gas atmosphere." J. Anal. Appl. Pyrolysis 72 (2004): 165-170; dated 2004.

Roy, C.; Chaala, A.; Darmstadt, H.; "The vacuum pyrolysis of used tires End-uses for oil and carbon black products." Journal of Analytical and Applied Pyrolysis 51 (1999): 201-221; dated 1999.

* cited by examiner

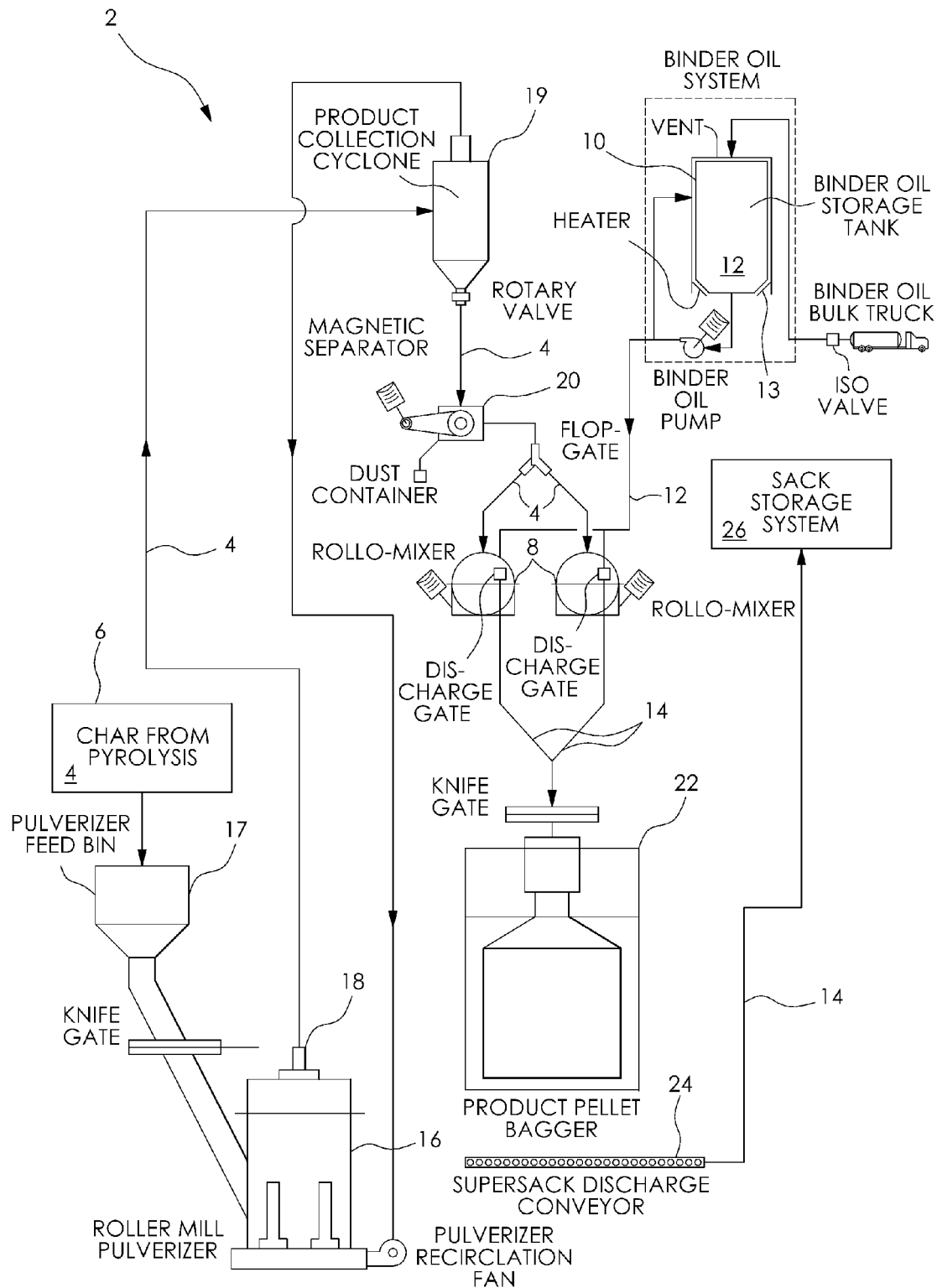

PELLETIZATION OF PYROLYZED RUBBER PRODUCTS

CROSS-REFERENCE TO RELATED APPLICATIONS

This application is a continuation of U.S. patent application Ser. No. 12/121,339, filed on May 15, 2008, and issued as U.S. Pat. No. 8,323,793, which in turn claims priority to U.S. Provisional Patent Application No. 60/938,480, filed May 17, 2007. The entire disclosures of the above applications are hereby incorporated herein by reference.

FIELD OF THE INVENTION

The present disclosure relates to waste recycling and, more particularly, to processes for pelletizing carbon black products produced by pyrolysis of waste materials.

BACKGROUND OF THE INVENTION

The U.S. Environmental Protection Agency (EPA) estimates that approximately 250 million scrap tires are generated in the United States each year. In the United States alone, the Rubber Manufacturers Association (RMA) has estimated that between two and three billion scrap tires currently reside in landfills or are otherwise stockpiled. Waste tires take up a significant amount of space in landfills, and burying of the tires can lead to landfill contamination. Stockpiling waste tires provides breeding grounds for pests and represents a significant fire hazard. Burning of tires causes a significant amount of air pollution, and run-off from tire fires can contaminate ground water. The handling and disposal of waste tires is a significant environmental problem, and the desirability of recycling waste is evident.

One method of recycling waste tires is pyrolysis. Known tire pyrolysis processes include heating tires to produce useful products such as oils, gases, recyclable metals, and carbonaceous char. As disclosed in U.S. Pat. Nos. 5,783,046, 6,372,948, and 7,037,410 to Flanigan, the entire disclosures of which are hereby incorporated herein by reference, a known pyrolysis process includes heating rubber in the substantial absence of oxygen to a temperature sufficient to pyrolyze the rubber, distilling a vapor comprising hydrocarbon from the rubber, and producing a solid carbonaceous char. Weinecke et al. in U.S. Pat. No. 7,101,463, hereby incorporated herein by reference in its entirety, describes a system and process for the recovery of oil from shredded vehicle tires that utilizes a pair of sequentially positioned packed towers. Also disclosed in U.S. Pat. No. 5,894,012 to Denison, hereby incorporated herein by reference in its entirety, is a waste processing system that produces clear and colorless oil for use in rubber and plastic applications and a carbonaceous char equivalent to a low structure furnace black.

The carbonaceous char produced from typical pyrolysis processes is generally a friable material. The carbonaceous char can be reduced to finely-divided particles or "fluff" form through known pulverization techniques. However, a mixing and dispersion of finely-divided particles of carbonaceous char into rubber and plastics is known to be problematic.

A variety of methods for converting individual particles of carbon black into pellets for improved mixing and dispersion are known to the art. For example, a finely-divided carbon black may be agitated under dry conditions in such a manner as to reduce the quantity of air or other gases associated with the carbon black and cause a degree of agglomeration of the discrete particles of the carbon black. Under wet conditions, the finely-divided carbon black may be agitated in a wet pelletizer in the presence of sufficient liquid pelletizing medium, such as water or a dilute aqueous solution of a binder such as sugar, molasses, dextrin, starch, calcium lignin sulfonate, and the like, to permit agglomeration of the individual particles into free-flowing pellets of suitable structural strength and stability. However, the application of standard carbon black dry and wet pelletization techniques to carbonaceous char from pyrolysis processes has not provided a desirable pelletization quality.

There is a continuing need for a system and method of converting a carbonaceous char from a pyrolysis process to a free-flowing pelletized form in order to permit inexpensive and convenient handling, storing and shipping thereof. Desirably, a carbon black product produced from the carbonaceous char is provided in a form convenient for use by manufacturers of rubber, plastics, and other commercial products.

SUMMARY OF THE INVENTION

In concordance with the instant disclosure, a system and method of converting a carbonaceous char from a pyrolysis process to a free-flowing pelletized form in order to permit inexpensive and convenient handling, storing and shipping thereof, and a carbon black product produced from the carbonaceous char in a form convenient for use by manufacturers of rubber, plastics, and other commercial products, is surprisingly discovered.

In one embodiment, a system for preparing a pelletized carbon black product includes a mixer in communication with a source of carbon black product, such as a carbonaceous char. The mixer is configured to receive the carbon black product. The system also includes a binder oil storage tank in fluid communication with the mixer. The binder oil storage tank is configured to inject a desired amount of a binder oil into the mixer with the carbon black product to pelletize the carbon black product.

In a further embodiment, a method for preparing a pelletized carbon black product comprises the steps of: providing a carbon black product; supplying the carbon black product to a mixer; injecting a binder oil into the mixer in a desired amount; and mixing the carbon black product and the binder oil, wherein the pelletized carbon black product is formed.

In another embodiment, a pelletized carbon black product includes a carbon black product in an amount greater than about 85 percent by weight relative to the total weight of the pelletized carbon black product. The carbon black product includes a carbon black in an amount between about 65 percent and about 98 percent, an organic volatile material in an amount between about 1 percent and about 20 percent, and an inorganic ash in an amount in an amount up to about 15 percent. All percentages are by weight relative to the total weight of the carbon black product. The pelletized carbon black product further includes a binder oil in an amount sufficient to agglomerate the carbon black product into substantially free-flowing pellets.

In yet another embodiment, a system for preparing a pelletized carbon black product includes a source of a carbon black product from a pyrolysis process. The system also has a pulverizer in communication with the source of carbon black product. The pulverizer is configured to pulverize the carbon black product to a desired particle size. The system further has a magnetic separator in communication with the pulverizer. The magnetic separator is configured to separate extraneous ferrous material from the carbon black product and make the carbon black product substantially metal-free. The system also has a classifier disposed between and in communication with the pulverizer and the magnetic separator. The classifier is configured to selectively provide only the carbon black product of the desired particle size to the magnetic separator. The system further includes a pelletization subsystem in communication with the magnetic separator. The pelletization subsystem is configured to pelletize the pulverized, classified, and substantially metal free carbon black product.

DRAWINGS

The above, as well as other advantages of the present disclosure, will become readily apparent to those skilled in the art from the following detailed description, particularly when considered in the light of the drawing described hereafter.

The drawing is a process flow diagram depicting a system for pelletizing a carbonaceous char from a pyrolysis process.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

The present disclosure includes a system 2 and method for pelletizing a carbon black product 4 formed from a carbonaceous char produced by pyrolysis of whole tires, tire shreds, waste feedstocks, waste plastic feedstocks, medical waste, and the like. An exemplary pyrolysis process is disclosed in U.S. Pat. No. 7,947,248 to Hamby et al., hereby incorporated herein by reference in its entirety. A skilled artisan should understand, however, that the present system 2 and method may be employed with the carbon black product 4 produced by another pyrolysis system and process, as desired.

As shown in FIG. 1, the system 2 includes a source 6 of the carbon black product 4. The source 6 may be a post-pyrolysis processing system configured to separate a quantity of extraneous materials, such as fiberglass and metals, from the carbon black product 4 following pyrolysis of the waste, for example. A mixer 8 is in communication with the source 6 of carbon black product 4. The mixer 8 is configured to selectively receive the carbon black product 4 from the source 6, as desired.

The system 2 further includes a binder oil storage tank 10 in fluid communication with the mixer 8. The binder oil storage tank 10 is configured to selectively inject a desired amount of a binder oil 12 into the mixer 8 when the carbon black product 4 is disposed therein. The binder oil tank 10 may have at least one heater 13 coupled thereto for heating the binder oil 12 to a desired temperature. It should be understood that the agitation and mixing of the carbon black product 4 and the binder oil 12 by the mixer 8 is sufficient to form a pelletized carbon black product 14 according to the present disclosure.

In certain embodiments, the mixer 8 is one of a batch drum mixer and a rollo-mixer, for example. It should be understood that more than one mixer 8 may be employed in the system 2. The mixer 8 generally is employed to admix the carbon black product 4 and the binder oil 12 and cause the carbon black product 4 to agglomerate into the pelletized carbon black product 14. The mixer 8 may rotate at a rate of up to about 500 RPM, for example. In another example, the mixer 8 is heated to a temperature from about 40° F. to about 200° F. to facilitate the admixing of the carbon black product 4 with the binder oil 12. A skilled artisan should appreciate that other suitable mixers and mixer parameters may be employed as desired.

In particular embodiments, the system 2 further includes a pulverizer 16. The pulverizer 16 is configured to reduce the carbon black product 4 to a desired particle size. For example, the pulverizer 16 may reduce the carbon black product 4 to about 325 mesh particles. The average particle size of the carbon black product 4 may be about five microns, although it should be appreciated that a range of particle sizes may be produced as desired. In particular, favorable results have been obtained when up to 99.99% of the pulverized carbon black product 4 passes through a 325 mesh screen. As a nonlimiting example, the pulverizer 16 is a roller mill pulverizer. Other suitable pulverizers 16 may also be employed.

The pulverizer 16 is disposed between the source 6 of the carbon black product 4 and the mixer 8. The pulverizer 16 is configured to pulverize the carbon black product 4, generally provided as large friable portions from the pyrolysis process, to the desired particle size. The pulverizer 16 may have a pulverizer feed bin 17, for example, which is adapted to selectivity feed the carbon black product 4 to the pulverizer 16. The carbon black product 4 may be gravity fed to the pulverizer 16 from the pulverizer feed bin 17. In other embodiments, the carbon black product 4 is fed to the pulverizer 16 by a mechanized means, such as a moving belt, screw, or the like.

The pulverizer 16 is further in communication with the mixer 8 and configured to provide the pulverized carbon black product 4 to the mixer 8 as desired. The carbon black product 4, when pulverized, may be pneumatically transferable by air conveyance, for example, in conjunction with an air compression system (not shown). A skilled artisan should understand that other means for transferring the carbon black product 4 through the system 2 may also be employed.

In a further embodiment, the system 2 includes a classifier 18. The classifier 18 is configured to selectively provide the carbon black product 4 of the desired particle size to the mixer 8, as desired. The classifier 18 is disposed between the pulverizer 16 and the mixer 8. The classifier 18 may be employed to separate extraneous material, such as fiberglass, from the carbon black product 4. The classifier 18 may be an air classification unit, for example. A commercially available air classification unit designed for operation at rotor speeds from about 400 RPM to about 2,000 RPM is the Micro-Sizer™ air classification system, manufactured by Progressive Industries, Inc. of Sylacauga, Ala. One of ordinary skill should appreciate that other classifiers 18 may also be used.

It should be appreciated that the carbon black product 4, following pulverization, may be collected and stored in a collection unit 19 for batch production of the pelletized carbon black product 14. As a nonlimiting example, the collection unit 19 may be a product collection cyclone or centrifugal collector as is known in the art. The product collection cyclone may use cyclonic action to separate the carbon black product 4 from an air carrier stream, for example. The centrifugal force created by cyclonic action throws the carbon black product 4 toward the wall of the product collection cyclone. After striking the wall, carbon black product 4 falls into a hopper located underneath the area of cyclonic action. It should be further understood that other suitable collection units 19 may also be employed.

The system 2 according to the present disclosure may further include a magnetic separator 20 configured to separate extraneous ferrous material from the carbon black product 4. As a nonlimiting example, the pulverized carbon black product 4 may be metered over the magnetic separator 20 to remove recyclable metal, such as steel belt wire from tires employed in the pyrolysis process, prior to the pelletization of the carbon black product 4. In particular embodiments, the magnetic separator 20 is a rotating magnetic drum. The magnetic separator 20 is disposed between the source 6 of carbon black product 4 and the mixer 8. The magnetic separator 20 may provide a substantially metal-free carbon black product 4 for delivery to the mixer 8.

The system 2 may further include a pellet bagger 22 as is known in the art. The pellet bagger 22 is in communication with the mixer 8. The pellet bagger 22 is configured to bag the pelletized carbon black product 14 produced by the mixer 8 for at least one of handling, storing and shipping. As a nonlimiting example, the pellet bagger 22 is configured to fill a supersack with the pelletized carbon black product 14. The pellet bagger 22 is in communication with a discharge conveyor 24 that delivers the bagged pelletized carbon black 14 to a storage system 26 for storing the pelletized carbon black 14 prior to an end use. Other suitable containers for handling, storing, and shipping the pelletized carbon black product 14 may also be filled. In one alternative embodiment, the system 2 may be adapted to feed the pelletized carbon black 14 directly to a rail car or container, for example, as desired.

The present disclosure further includes a method for preparing the pelletized carbon black product 14. The method includes the steps of providing the carbon black product 4 and supplying the carbon black product 4 to the mixer 8. The binder oil 12 is injected into the mixer 8 in a desired amount. The carbon black product 4 and the binder oil 12 are admixed to thereby form the pelletized carbon black product 14.

As described hereinabove, the carbon black product 4 is typically a carbonaceous char produced during pyrolysis of a waste material, such as waste tires. In a particular embodiment, the carbon black product 4 is provided by a pyrolysis process as disclosed in and U.S. Pat. No. 7,947,248 to Hamby et al. For example, the pyrolysis process includes the step of depositing a quantity of waste into a porous container, the porous container adapted to allow at least one convective stream of substantially anaerobic gas to flow therethrough. The porous container is inserted into a pyrolysis thermal processor. The thermal processor is sealed and at least one convective stream is circulated therethrough. The waste is heated with the convective stream of gas according to a time-temperature profile to pyrolyze the waste and produce the carbon black product 4. The convective stream of gas is then circulated through a cooler to cool the carbon black product 4. The carbon black product 4 is subsequently collected for pelletization in the mixer 8.

The method further includes the step of pulverizing the carbon black product 4 to a desired particle size prior to supplying the carbon black product 4 to the mixer 8. As described hereinabove, a quantity of extraneous material may also be separated from the carbon black product 4 with at least one of the classifier 18 and the magnetic separator 20 prior to supplying the carbon black product 4 to the mixer 8. In a particular embodiment, the separation includes magnetically separating the quantity of ferrous material from the carbon black product 4 to provide the substantially metal-free carbon black product 4.

The admixing of the carbon black product 4 and the binder oil 12 according to the method of the present disclosure produces the pelletized carbon black product 14. It should be appreciated that the carbon black of the carbon black product 4 includes a substantially amorphous carbon. The carbon black product 4 may include carbon black in an amount between about 65 percent and about 98 percent. The carbon black product 4 further includes an organic volatile material in an amount between about 1 percent and about 20 percent. The carbon black product 4 also includes an inorganic ash in an amount up to about 15 percent. All percentages are by weight relative to the total weight of the carbon black product 4. The inorganic ash may include elemental zinc from zinc oxides originally used in the waste rubber as an activator, and inorganic fillers employed in the waste rubber, such as silica and clays, for example. In certain embodiments, the inorganic ash may include a quantity of elemental sulfur, for example, that was employed to originally vulcanize waste rubber.

As a further nonlimiting example, the carbon black product 4 may include between about 85 percent and about 95 percent carbon black and about 1 percent to about 15 percent residual volatiles in the form of residual polymer and hydrocarbons remaining at the end of the pyrolysis process. The carbon black product 4 also may include an inorganic ash in an amount up to about 9 percent to about 12 percent. It is surprisingly found that the residual volatiles advantageously minimize dusting of the pelletized carbon black product 14 and facilitate dispersion and miscibility of the pelletized carbon black product 14 in elastomer and oil applications.

The pelletized carbon black product 14 has the binder oil 12 in an amount sufficient to provide a pelletized carbon black product 14 with a pellet hardness and fines content suitable for use in rubber mixing, for example. Pellets must have a sufficient strength to resist physical break down during transportation, but also facilitate dispersion in rubber and plastic compounds. Fines are considered an indicator of bulk handling and rubber and plastic mixing difficulties. The pelletized carbon black product 14 may have a pellet hardness of up to about 40 gf, as a nonlimiting example. As the binder employed to pelletize the carbon black product 4 an oil, it should be appreciated that the pelletized carbon black product 14 is substantially non-dusting and may have minimal fines content. The amount of the binder oil 12 may be selected to provide a desirable fines content and level of non-dusting as desired.

As a nonlimiting example, the binder oil 12 may be used in an amount up to about 15 percent by weight relative to the total weight of the pelletized carbon black product 14. In particular embodiments, the binder oil 12 in an amount of about 12.5 percent by weight relative to the total weight of the pelletized carbon black product 14 is sufficient to form pellets with the desired characteristics. As nonlimiting examples, the binder oil 12 is at least one of a highly aromatic oil, a naphthenic oil, and a paraffinic oil. It should be appreciated that product oil derived from the pyrolysis process may also be used as a binder oil 12. A skilled artisan may select other suitable binder oils 12 and levels as desired.

Individual pellets of the pelletized carbon black product may have an average diameter from about 0.125 inches to about 0.0625 inches, for example. In other embodiments, the pellets produced according to the present method may fall within a desired range of about 18 to about 60 mesh, for example. The individual pellets of the pelletized carbon black product 14 may be substantially spherical, although one of ordinary skill in the art should understand that the pelletized carbon black product 14 may be provided other shapes that facilitate flowability of the pelletized carbon black product 14. The pelletization process minimizes product dusting, and improves density and flow properties associated with the carbon black product 4 produced by pyrolysis of waste. The pelletized carbon black product 14 may then be stored, for example, in a silo, supersack or in small bags for delivery and the desired end use.

It should be appreciated that the pelletized carbon black product 14 according to the present disclosure provides for an optimized dispersion and miscibility of the carbon black product 4 in rubber and plastic compounds, particularly in comparison to known pyrolysis products provided in fluff form. It is surprisingly found that the use of the binder oil 12, in conjunction with the residual volatiles of the pelletized carbon black product 4, advantageously minimizes dusting of the pelletized carbon black product 14.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for preparing a pelletized carbon black product, comprising:
   a source of a carbon black product from a pyrolysis process, the carbon black product including extraneous ferrous material;
   a mixer for pelletization;
   a pulverizer in communication with the source of carbon black product, and disposed between the source of the carbon black product and the mixer, the pulverizer configured to reduce a size of the carbon black product to a predetermined particle size of 325 mesh, wherein the pulverizer is a roller mill pulverizer;
   a magnetic separator in communication with the pulverizer, and disposed between the source of the carbon black product and the mixer, the magnetic separator configured to separate the extraneous ferrous material from the pulverized carbon black product and make the pulverized carbon black product substantially metal-free for delivery to the mixer, wherein the magnetic separator is a rotating magnetic drum; and
   a classifier disposed between the pulverizer and the mixer and in communication with the pulverizer and the magnetic separator, the classifier configured to selectively provide the pulverized carbon black product of the predetermined particle size of 325 mesh to the magnetic separator, wherein the classifier is an air classification unit, and
   wherein the mixer selectively receives the pulverized and substantially metal free carbon black product to admix the pulverized and substantially metal free carbon black product and a liquid pelletizing medium causing the pulverized and substantially metal free carbon black product to agglomerate into a pelletized carbon black product, wherein the mixer is configured to be heated to a temperature from about 40 degrees F. to about 200 degrees F. to facilitate the admixing of pulverized and substantially metal free carbon black product with the liquid pelletizing medium.

2. The system according to claim 1, wherein the mixer is one of a batch drum mixer and a rollo-mixer.

3. The system according to claim 1, wherein the air classification unit operates at rotor speeds from about 400 RPM to about 2,000 RPM.

4. The system according to claim 1, further comprising a product collection cyclone disposed between and in communication with the classifier and the magnetic separator.

5. The system according to claim 4, wherein the product collection cyclone uses cyclonic action to separate the carbon black product from an air carrier stream coming form the classifier, a centrifugal force created by a cyclonic action throwing the carbon black product toward a wall of the product collection cyclone, after which the carbon black product falls into and is collected in a hopper located underneath an area of the cyclonic action for feeding to the magnetic separator.

6. The system according to claim 5, wherein a rotary valve is disposed between and in communication with the hopper of the product collection cyclone and the magnetic separator for a selective batch feeding of the carbon black product to the magnetic separator.

7. The system according to claim 4, further including a pulverizer recirculation fan disposed between and in communication with the pulverizer and the product collection cyclone.

8. The system according to claim 1, further comprising a pulverizer feed bin disposed between and in communication with the source of the carbon black product and the pulverizer.

9. The system according to claim 8, further comprising a knife gate disposed between the pulverizer feed bin and the pulverizer, the knife gate permitting a selective feeding of the carbon black product to the pulverizer.

10. The system according to claim 1, further comprising a pellet bagger in communication with the pelletization subsystem and configured to bag the pelletized carbon black product produced therefrom for at least one of handling, storing and shipping.

\* \* \* \* \*